J. KROK.
MOTORCYCLE AND THE LIKE.
APPLICATION FILED NOV. 23, 1917.

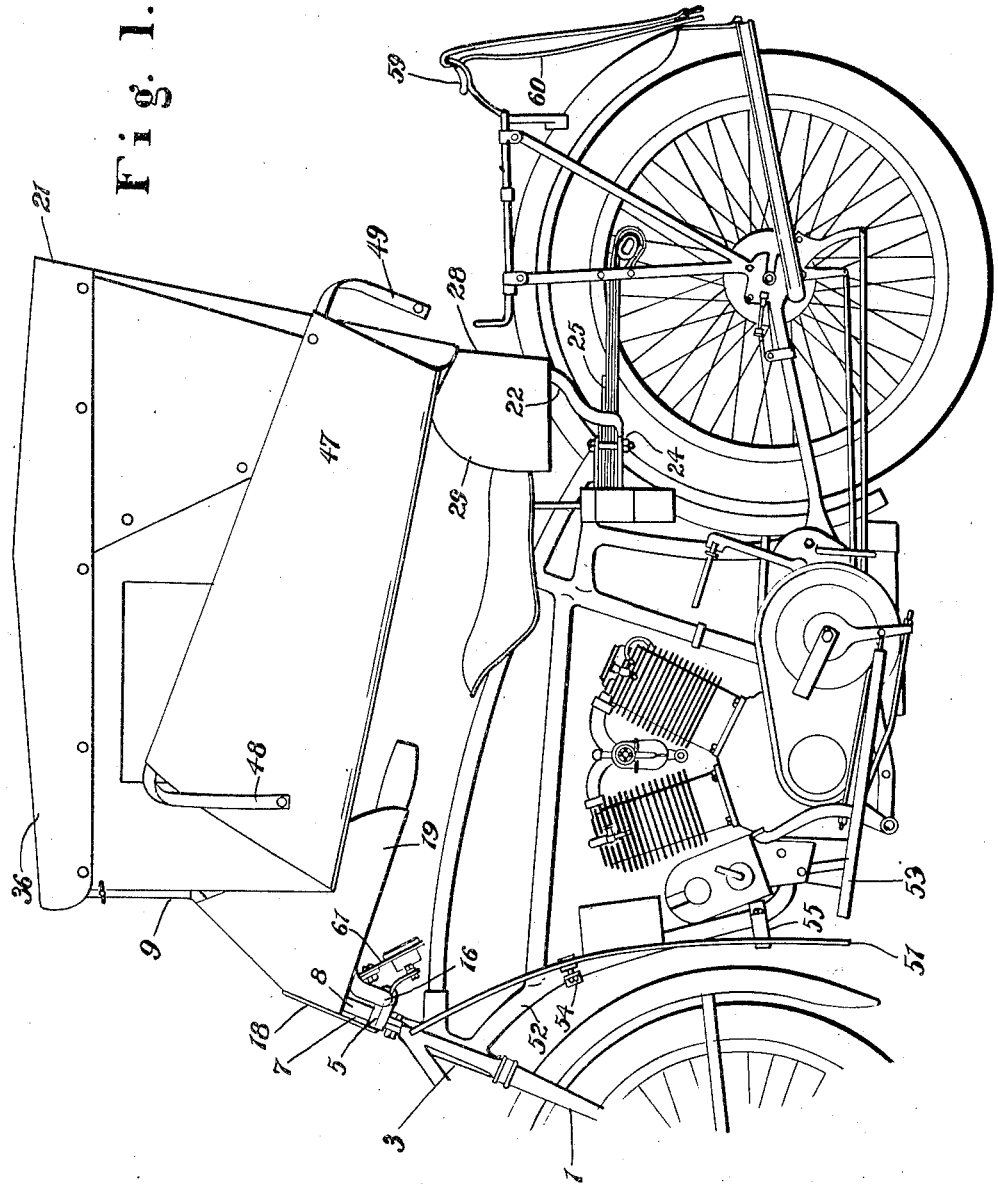

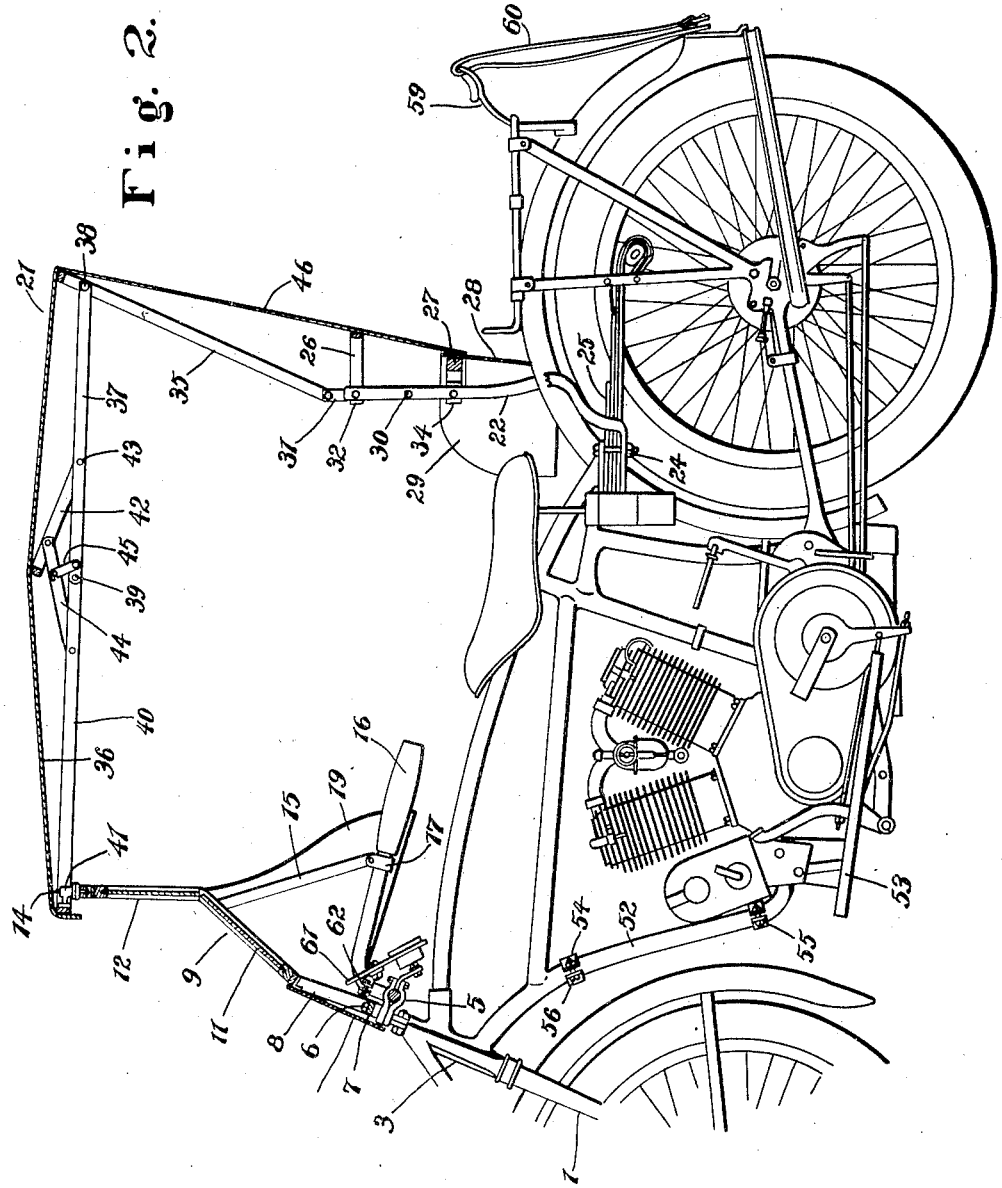

1,357,239.

Patented Nov. 2, 1920.
5 SHEETS—SHEET 3.

WITNESS:
Howard P. King.

INVENTOR:
Joseph Krok,
BY
Marble & Everett,
ATTORNEYS.

J. KROK.
MOTORCYCLE AND THE LIKE.
APPLICATION FILED NOV. 23, 1917.

1,357,239.

Patented Nov. 2, 1920.
5 SHEETS—SHEET 4.

WITNESS:
Howard P. King

INVENTOR:
Joseph Krok,
BY Marble & Everett,
ATTORNEYS.

J. KROK.
MOTORCYCLE AND THE LIKE.
APPLICATION FILED NOV. 23, 1917.

1,357,239.

Patented Nov. 2, 1920.

UNITED STATES PATENT OFFICE.

JOSEF KROK, OF BLOOMFIELD, NEW JERSEY.

MOTORCYCLE AND THE LIKE.

1,357,239.　　　　　　Specification of Letters Patent.　　Patented Nov. 2, 1920.

Application filed November 23, 1917. Serial No. 203,506.

*To all whom it may concern:*

Be it known that I, JOSEF KROK, a subject of the King of Austria, and a resident of Bloomfield, in the county of Essex and State of New Jersey, have invented new and useful Improvements in Motorcycles and the like, of which the following is a specification.

The objects of this invention are to provide an improved windshield for motorcycles; to secure a firm and stable mounting of the same upon the steering post and handle bars; to combine with a windshield a top which shall cover and protect the rider; to allow suitable motion between said top and windshield, to accommodate steering the motorcycle; to mount the top firmly and fixedly upon the frame of the motorcycle; to secure an improved construction of top; to provide suitable means for holding the top both in raised or open position and in lowered or closed position; to provide lower lateral shields at the front of the machine which coöperate with the windshield and top to protect the rider; to provide inside the windshield a suitable instrument board, and to secure other advantages and results as may be brought out in the following description.

Referring to the accompanying drawings in which like numerals of reference indicate the same parts throughout the several views, Figure 1 is a side elevation of a motorcycle illustrating my invention, the side of the top being shown unfastened and partly lifted, for greater clearness;

Fig. 2 is a similar elevation with the top and windshield in vertical central longitudinal section and the lower lateral shield next the observer broken away;

Fig. 3 is a transverse sectional view of the motorcycle and top, taken just back of the handle bars and in front of the driver's seat and the motor looking toward the front of the machine;

Figure 4:
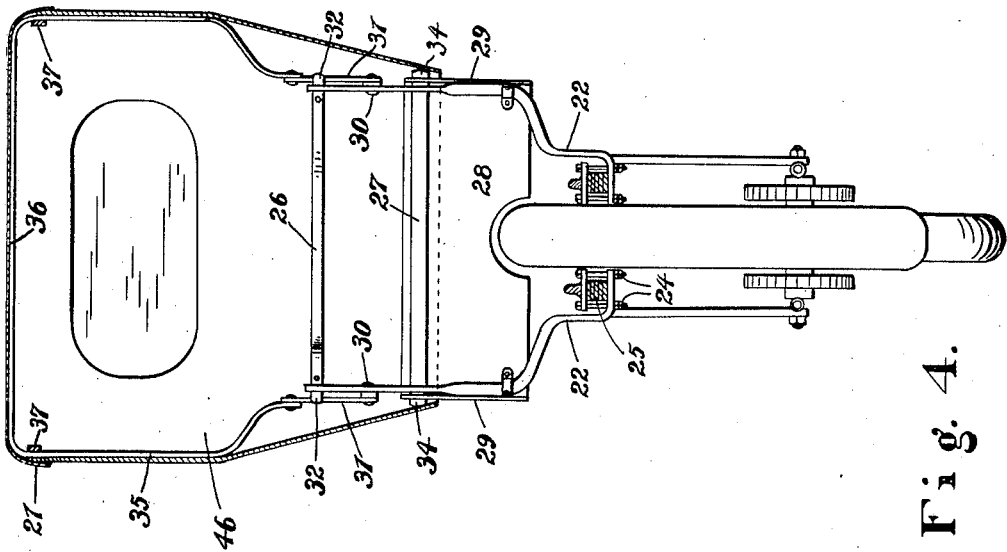
Fig. 4 is a similar section taken just back of the driver's seat and looking toward the rear of the machine.
Figure 5:
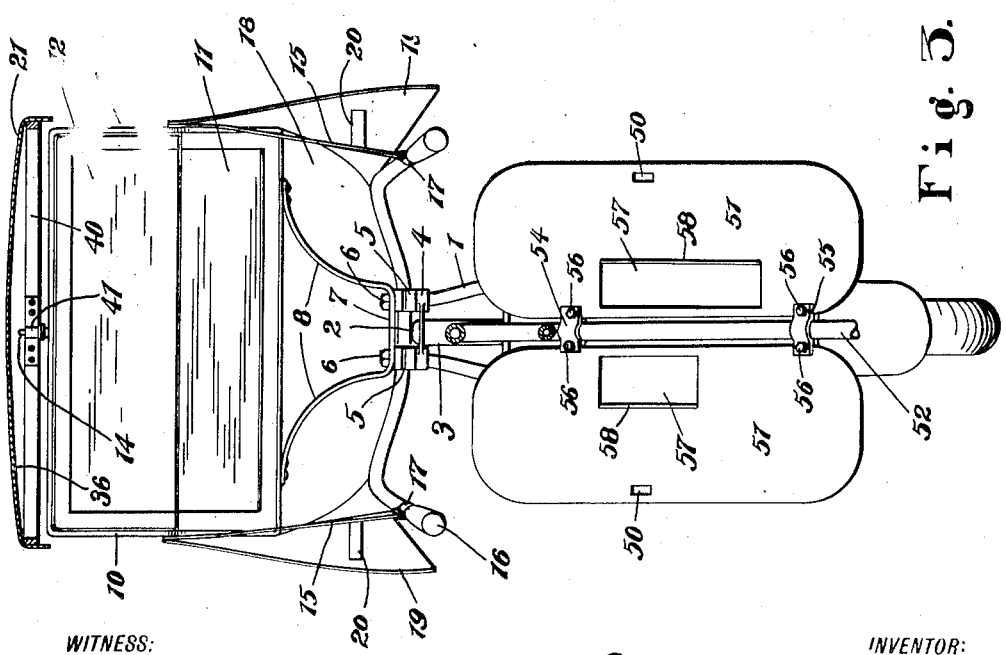
Fig. 5 is a detail perspective of the pivotal connection between the windshield and top.
Figure 5:
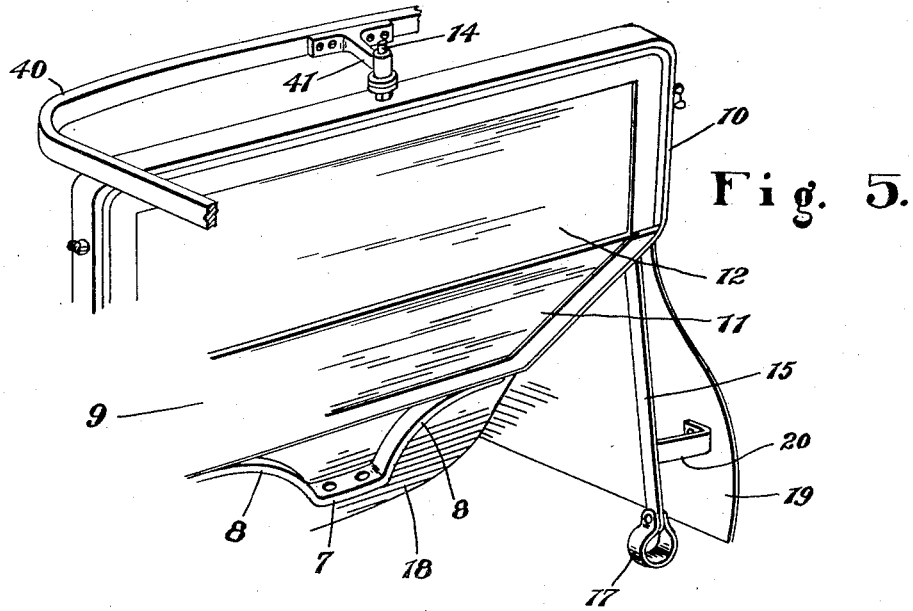
Figure 6:
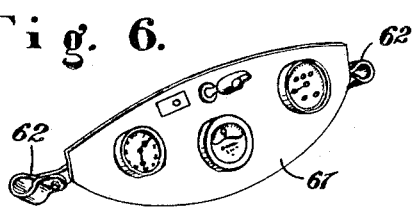
Fig. 6 is a perspective view of the instrument board detached.
Figure 7:
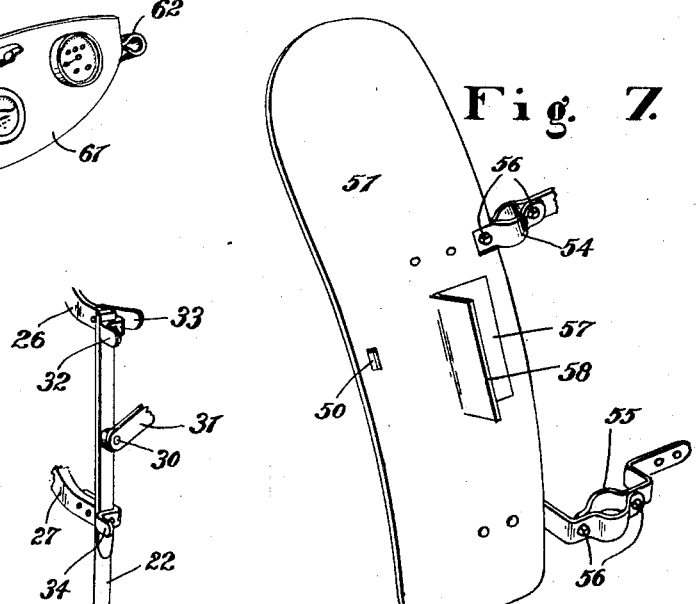
Fig. 7 is a perspective view of one of the lower lateral shields.

In the particular embodiment of the invention illustrated in said drawings, I have shown a motorcycle having a front fork 1 the stem 2 of which is carried in an upper head fitting 3 above which is a T or anchor plate 4 fast with respect to the stem 2 and the sides of the fork 1 which extend at the side of said head fitting up to the anchor plate. It will therefore be seen that the stem 2, anchor plate 4 and fork sides all turn together. Above said anchor plate 4 are split clamps 5, 5 projecting toward the rear of the motorcycle and held in position by bolts 6, 6 which depend therethrough and through said anchor plate into the upper ends of the fork sides. In carrying out my invention I mount upon these same bolts 6, 6, a bracket 7 having arms 8, 8 extending upwardly and supporting a windshield 9.

The windshield preferably comprises a frame 10 within the lower part of which is fixedly secured the lower section 11 of the window, and also to which is secured an upper section 12, preferably pivoted upon a horizontal line so its lower edge can swing toward and away from the rider. As shown, the lower portion of the frame 10 and lower section 11 of the window are inclined from their lower edges upwardly rearward of the motorcycle, while the upper part of the frame is substantially vertical, although this may be otherwise if found more desirable. In manufacture, I prefer to have a central point of the upper edge of said frame 10 intersected by the axis of the steering post or stem 2 extended, and from this central point a pivot pin 14 is fixedly secured upon the frame to stand upright for purposes hereinafter described.

As shown in the drawings, I provide braces 15 from the sides of the frame 10 downwardly rearward to the handle bars 16 of the motorcycle. These braces 15 are shown attached securely to the handle bars 16 by means of split collars 17 having parallel ends upon opposite sides of the lower ends of the braces through which clamping screws may be passed to secure the parts together and the collar upon the handle bars. It may be here noted that the handle bars 16 do not pass over the steering post, but are off-set toward the rear of the motorcycle and are held in the split clamps 5, 5 above described.

From the lower and preferably front edge of the frame 10 of the windshield, depends an apron 18 which coöperates with the window portions above to shield the rider, and in practice it is preferable to make this apron 18 of sheet metal, although it will be obvious that any desired material may be used. From the side edges of the apron 18 gauntlet extensions 19, 19 are provided which extend rearwardly at the sides of the handle bars but spaced outward far enough therefrom so as not to interfere with the proper control of the handle bars by the rider. These gauntlet extensions 19, 19 are shown as extending upwardly to about the middle of the frame 10 and secured thereto upon the outside of the braces 15. For added rigidity, the lower part of the gauntlet extensions 19, 19 are connected to the braces 15, 15 by lateral brackets 20, 20.

Combined with the windshield for protecting the rider, is a top 21 supported from a fixed part of the motorcycle. In carrying out this feature of my invention, I provide uprights 22, 22 back of the seat which have their lower ends bent forwardly in the present embodiment and secured by bolts 24 which clamp the forward part of the frame to the leaf spring 25, although it is to be understood that other support may be provided for these uprights as found desirable or necessary. Between these uprights are cross-pieces 26, 27 one near the top and one lower down on said uprights, which form a chair-like back for the rider, and as shown these cross-pieces are bent rearwardly between said uprights. For added protection to the rider, I have shown a skirt 28 depending from the lower cross-piece 27, said skirt having a forwardly directed portion 29 from its side edges upon the outside of the uprights 22 to which they are fastened.

Pivoted, as at 30, to the uprights 22, 22 preferably above the lower cross-piece 27, and below the upper cross-piece 26, are links 31 adapted to be swung with their free ends upward and held between fixed lateral stops 32 at the front of the uprights and releasable or swinging stops 33 at the rear of the uprights (see Fig. 8 particularly, also Figs. 2, 4, 9 and 10). Upon releasing said pivoted stop 33, the link 31 may be swung rearwardly downward outside of the skirt 28 until it again engages a stop 34 at the front of the uprights projecting through the skirt below the point of pivoting of the link. As shown in the drawings, the fixed stops 32, 34 are the ends of the upper and lower cross-pieces 26, 27 respectively, offset from the body of the cross-pieces so as to project from the forward edge of the uprights.

To the free ends of the links 31 are pivoted ends of a bow 35, which, when the top is raised as in Figs. 1 and 2, stands upward for supporting the back end of the top covering 36. Near the top of this rear bow, as viewed in raised position, are side pieces 37, 37 which extend horizontally forward from points of pivoting 38, 38 on the rear bow 35. To the other or forward ends of these side pieces 37, 37 I have shown pivoted, as at 39 the ends of a front bow 40, which, in open or raised position of the top, are in the same plane with said side pieces. Upon this front bow 40, at a middle part thereof, is provided means for supporting the front of the top upon the windshield. This means is shown as a bracket 41 secured to the bow so as to lie in the plane thereof and project from said bow in the same general direction as the ends of the bow, which, with the top raised, is rearwardly of the motorcycle. At its rearward end, this bracket has a vertically disposed hole for receiving the pivot pin 14 upon the top of the windshield frame. Since this pin is upon the axis of turning of the front fork, said fork may be turned with the top resting upon the windshield.

Both for supporting the middle part of the covering 36 and for holding the side piece 37 and front bow 40 in proper relation, a middle bow 42 is provided pivoted at its ends, as at 43, to the side pieces 37 a predetermined distance from the pivoting of said side pieces to the front bow. This middle bow slopes upwardly forward to substantially a vertical plane through said pivoting of the front bow, and pivotally attached to said middle bow at its sides near the front thereof are props 44 also pivotally attached to the front bow. These props are shown supported by releasable hooks 45 pivoted to the side pieces 37 and taking over appropriate protuberances upon said props, although this might be otherwise.

In addition to the top cover 36, I also provide a back curtain 46 and side curtains 47, 47. These side curtains are provided with suitable straps 48, 49 adjacent their bottom edges at the front and back respectively of the curtains. The back strap 49 is adapted to be passed around the upright 22 adjacent the attachment thereof to the spring 25, thus holding the curtain down, but it will be understood that this strap may be attached to any other fixed part of the motorcycle if found more desirable. The front strap is adapted to be inserted through holes 50 adjacent the outer edges of lower lateral shields 51 supported upon the front tubing 52 of the motorcycle frame, which thus hold the curtains spaced outward from the rider.

The lower lateral shields 51 above referred to are preferably of sheet metal and extend from adjacent the front apron 18 downward substantially to the foot rest 53 affording added protection for the rider. For mounting the lower lateral shields 51 upon said front tubing 52, I have shown clamps 54, 55 near the top and bottom respectively of the said shields, said clamps each comprising a pair of members between which the said tubing may be pinched upon securing said members together by bolts 56. One member of each of these clamps is carried by one of the lateral shields and the other member is carried by the other shield. In this way, the shields will be clamped upon the frame of the motorcycle, but may be removed by loosening said bolts. As shown, these lateral shields also have in themselves openings 57 near the inner edges of said shields adjacent the engine cylinders whereby a draft of air is obtained for cooling the engine. Preferably flanges 58 are turned up adjacent said openings 57 along the edge thereof farthest from the motorcycle frame, so as to direct the current of air toward the engine.

Figure 8:
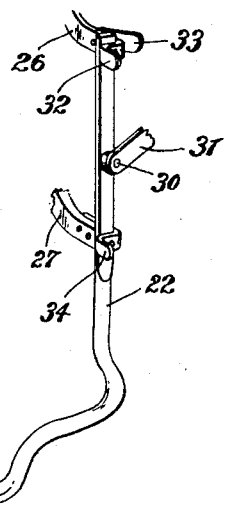
Fig. 8 is a perspective view of one of the uprights and its attached parts by means of which the top is secured to the frame of the motorcycle.
Figure 9:
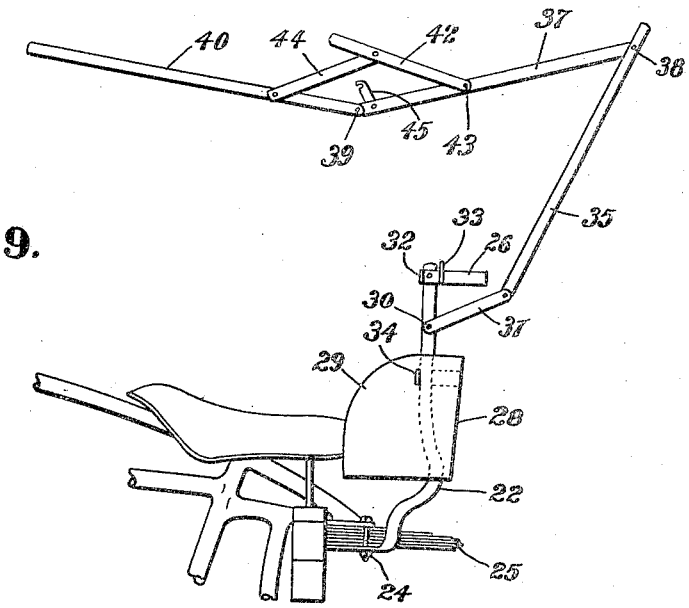
Fig. 9 is a side view of the frame of the top and those portions of the motorcycle to which it is attached, showing the positions assumed by the parts of the top as it begins to close or lower.
Figure 10:
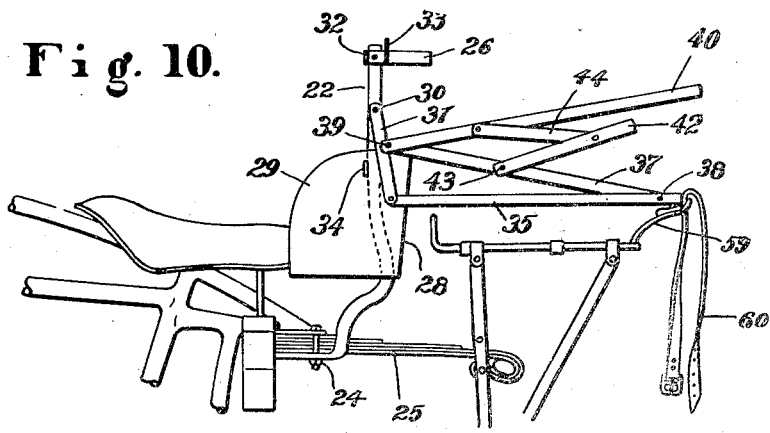
Fig. 10 is a similar view illustrating the top nearly closed or lowered.

When it is desired to lower the top, the swinging stops 33 at the back of the uprights 22 are swung upwardly from behind the links 31 which may then be swung downwardly (see Figs. 8, 9 and 10). The releasable hooks 45 are also swung out of engagement with their protuberances upon the props 44 permitting the front bow 40 to be swung upwardly backward, thereby swinging the middle bow 42 upwardly back so that both of said bows may close downwardly upon the side pieces 37, 37 and all of said parts fold down upon the rear bow 35. A suitable support 59 is provided at the back of the motorcycle for receiving the top when thus lowered, said support preferably being midway between the sides of the top. A strap 60 is shown carried by this support 59 by means of which the top may be securely held in place upon the said support.

Mounted upon the handle bars, preferably just inside of the windshield, is an instrument board 61 upon which any desired instruments may be mounted for the information and convenience of the driver. This instrument board is shown as sloping rearwardly downward and is carried by means of metal straps 62, at its ends which are bent around the handle bars and clamped by means of screws.

Obviously various modifications and changes may be made in the manufacture of my improved motorcycle, without departing from the spirit and scope of the invention, and I do not wish to be understood as restricting myself except as required by the following claims when construed in the light of the prior art.

Having thus described my invention, what I claim is:

1. The combination with a motorcycle frame including a steering post, a transverse anchor plate fixed to the said steering post, and a pair of fork arms secured to said anchor plate, of a windshield fastened to said anchor plate and movable therewith as the steering post is rotated.

2. In a motorcycle, a top secured to the rear of the motorcycle and adapted to extend forwardly over the same, a windshield mounted upon the steering post and handle bars and movable with the handle bars, and means pivotally supporting the forward part of the top upon said windshield.

3. In a motorcycle, a windshield mounted on the steering post and handle bars thereof, a pivot pin at the top of said windshield upon the axis of the steering post extended, and a top for covering the driver's seat secured at the back of the motorcycle and carried at its forward end upon said pivot pin whereby the windshield may turn with respect to the top.

4. In a motorcycle, uprights at the back of the driver's seat, links pivoted to the uprights, a bow pivoted to the links for supporting the rear end of a top, means for supporting the front end of the top, and means for releasably holding the links in upward position, whereby the top may be raised or lowered by swinging the links.

5. In a motorcycle, an upright, a link pivoted intermediate of the ends of the upright, stops for said link whereby it may swing to extend upright from its point of pivoting or depend downwardly therefrom, a releasable stop for holding the link in its upward position against the fixed stop, and a top pivoted to said link.

6. In a motorcycle, a top having a front bow, side pieces pivotally secured to the ends of said front bow and adapted to lie in substantially the plane of the bow with the top open, a middle bow pivoted to said side pieces, props pivoted to the front bow and to said middle bow, and releasable hooks pivoted to the side pieces and engaging the props whereby the front bow and side pieces may be held open.

7. In a motorcycle, a top providing a front bow, a back bow transverse to the front bow when the top is open, said back bow adapted to support the rear end of the top, means hingedly supporting said back bow from the frame of the motorcycle, a bracket upon the front bow, and means pivotally supporting said bracket in alinement with the steering post of the front wheel, whereby said supporting means may turn with said steering post.

8. In a motorcycle, uprights secured to the frame of the motorcycle at the back of the driver's seat, cross-pieces extending between said uprights for bracing them and coöperating to form a back to the driver's seat, and a skirt depending from one of said cross-pieces substantially to the wheel of the motorcycle and having side portions extending forwardly toward the seat for the protection of the driver.

9. In a motorcycle, a top for protecting the rider, means for supporting said top at its front and back, side curtains for said top, and members in front of the driver's seat extending laterally outward from the frame of the motorcycle providing means whereby the side curtains may be attached and held at a distance from said frame.

10. In a motorcycle having a frame, lower lateral shields extending substantially from the foot rests to the handle bars and projecting outwardly from the frame for the protection of the driver, said shields having flanges for directing air to cool the motor, and means for securing said shields upon the frame of the motorcycle.

In testimony whereof I have signed this specification in the presence of two subscribing witnesses.

JOSEF KROK.

Witnesses:
RUSSELL M. EVERETT,
HOWARD P. KING.